Figure 1:
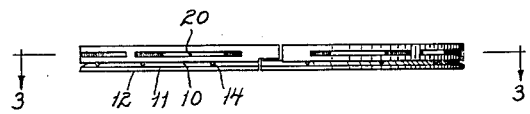

June 29, 1937.  L. W. HERBST  2,085,362

PISTON RING

Filed Sept. 12, 1934

Inventor

Louis W. Herbst

By Bates, Golrick, & Teare

Attorneys

Patented June 29, 1937

2,085,362

UNITED STATES PATENT OFFICE 2,085,362

PISTON RING

Louis W. Herbst, Cleveland, Ohio

Application September 12, 1934, Serial No. 743,740

5 Claims. (Cl. 309—45)

This invention relates to piston rings, and particularly to those which are commonly known as oil rings, that are used on the lower piston grooves. There are two types of rings that are generally in use today, one is the ventilated ring, which has the slots cut entirely therethrough, and which act as reservoirs to receive the oil that is forced up behind the ring during the downstroke of the piston. On the up-stroke, the reservoir unloads into the crank case through a passageway in the piston wall directly behind the ring. The chief objection therefore, of a ring, having only a ventilated slot is that the oil cannot unload back onto the cylinder wall, with the result that on present day high-speed engines, there is not enough oil left on the cylinder wall to provide adequate lubrication.

A second type of ring, which is used at present, has a pocket on the lower outer surface thereof. The pocket has openings, which extend downwardly therefrom and communicate with an annular groove on the lower face of the ring. Thus, whenever the piston moves downwardly, oil is scraped off the cylinder wall and is forced under the bottom of the ring, and thence upwardly through passageways into the side wall pocket. Excess oil flows up behind the ring and onto the upper surface of it. On the succeeding up stroke of the piston, the reservoir, or pocket empties its contents onto the cylinder wall to provide the necessary lubrication, but the oil on the top of the ring is forced onto the cylinder wall above the ring from whence, it has access to the combustion chamber.

The extremely high speed at which the pistons are operated in motor vehicles at the present time has made the problem of cylinder lubrication an extremely difficult one to solve, for not only must sufficient oil be retained on the cylinder wall, for lubrication purposes, but also the amount of such oil must be controlled to avoid its entrance in the combustion chamber. The ventilated ring alone is not entirely satisfactory, for it is not capable of returning sufficient oil onto the cylinder wall to provide adequate lubrication. On the other hand, the pocket type is not entirely satisfactory, because it is not capable of handling excess oil with sufficient rapidity to avoid its escape into the combustion chamber. The escape of oil from the pocket type of ring occurs, notwithstanding the fact that the piston wall is ventilated in back of the ring and is due to the fact that the sudden reversal of pressure by the piston against the ring occurs too rapidly in high speed engines to give all of the trapped oil time to flow through the piston wall vents.

An object of the present invention therefore, is to make a piston ring, which will operate to prevent the escape of oil into the combustion chamber, and yet which will retain enough oil on the cylinder wall to lubricate the piston adequately, regardless of the speed at which the engine is designed to operate. In this connection, my invention contemplates a piston ring construction, which will accomplish the objects enumerated without unduly weakening the mechanical strength of the ring.

Figure 2:
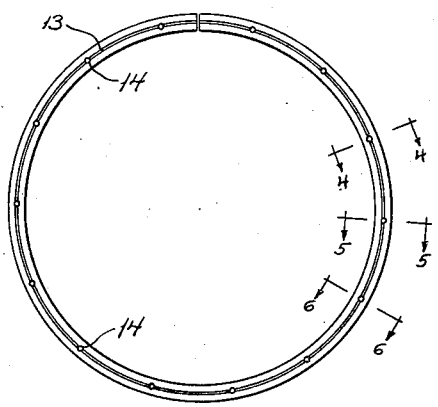
Figure 3:
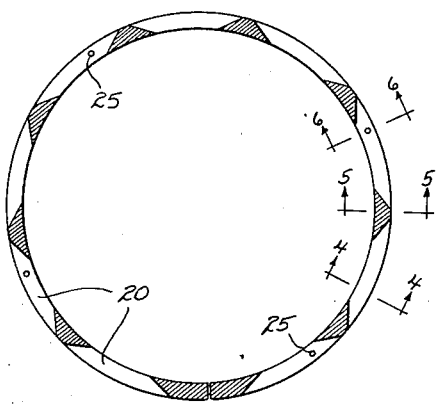
Figure 4:
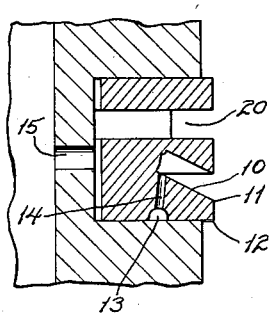
Figure 5:
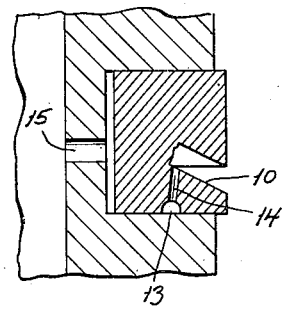
Figure 6:
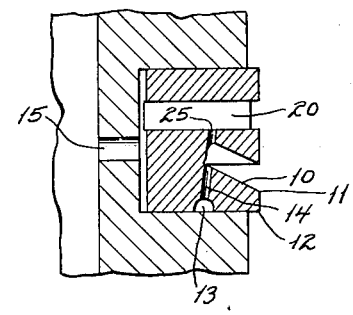

Referring now to the drawing, Fig. 1 is a side elevational view of a ring, which embodies my invention; Fig. 2 is a bottom plan view thereof; Fig. 3 is a sectional view taken on the line 3—3 in Fig. 1, and Figs. 4, 5, and 6 are sectional views taken through a piston on the correspondingly numbered lines in Figs. 2 and 3.

The ring which I have invented and have illustrated in the drawing has a pocket 10, which is in the form of an annular groove that is disposed on the lower portion of the ring and on the outer surface thereof. The lower lip 11 of the groove is positioned above the bottom edge 12 of the ring. Inasmuch as the edge 12 is in contact with the cylinder wall, any oil, which is not forced downwardly by the ring, is allowed to flow under it, and into the annular groove 13. The groove, in turn, is connected by spaced passageways 14 with the pocket 10, so that oil may flow into the pocket, which acts as a reservoir, and from which oil may flow onto the cylinder wall on the succeeding up-stroke of the piston. The size of the pocket 10 therefore, is governed by the amount of oil, which is required to provide adequate cylinder wall lubrication, and I have found that if the pocket is sloped upwardly at an angle of about 45-degrees, it will deposit sufficient oil to lubricate adequately the present day high speed engines that are used on motor vehicles.

As heretofore explained, the pocket type of ring is not adapted to handle excess oil, such as may be required in a high speed engine, because it is easy for the oil to work around behind the ring, thence to the top thereof, from whence it escapes readily above the ring. Efforts have been made to stop such escape by venting the piston with passageways 15, which extend through the piston wall at spaced intervals behind the ring; but the rapidity at which the piston moves in the cylinder is too great at high speeds to permit sufficient time for the oil to be vented through the passageways in the piston.

I have found that if the ring is provided with slots 20, which extend entirely therethrough, that the slots act as a reservoir of ample capacity to receive the excess oil. Inasmuch as the reservoir 20 is located in the upper portion of the ring, it is obvious that it is in a position to trap the excess oil on one stroke of the piston, and to return it to the crank case on the succeeding stroke, without forcibly ejecting it onto the cylinder wall above the ring.

An advantage of having the mouth of the pocket 10 above the scraping edge 12 of the ring is that the pocket cannot act as a scoop on the down stroke, as would be the case if the outer surface of the ring overhung the edge 12. Consequently the pocket can be designed to release just the proper amount of oil onto the wall to insure lubrication. If the ventilated ring were not used in connection with the pocket then the pocket would have to be much larger to avoid the escape of oil above the ring. On the other hand, a pocket of sufficient size to return all the excess oil onto the cylinder wall, would weaken the mechanical strength of the ring.

To facilitate the passage of oil into the ventilating groove 20, I may, if desired, provide passageways 25, which connect the groove 10 at spaced intervals with some of the slots 25. In this way, oil may enter some of the slots directly from the pocket 10, or excess oil may enter the slots in a region directly behind the ring.

I claim:

1. A piston ring having two reservoirs therein in different transverse planes, one extending upwardly and inwardly from the outer surface thereof, the ring having an annular groove in the bottom thereof, and having passageways extending between the lower reservoir and the groove, the upper reservoir comprising a plurality of passages which extend through the ring from the inner to the outer surfaces thereof, the ring having passageways which provide communication between the lower reservoir and the upper reservoir.

2. A piston ring, having a reservoir therein, which opens outwardly of the ring and divides it into a lower land surface, and an upper land surface, spaced relatively restricted passages formed in the ring and extending from the reservoir to the bottom surface of the ring, and other spaced passages each having at least a portion thereof relatively restricted formed in the ring and extending from the reservoir to the inner surface of the ring, said latter passages forming lubricant ducts through which the material in the reservoir may be discharged while the ring is moving in a cylinder.

3. A piston ring having an outwardly open pocket with lands coextensive therewith above and below the same for contact with a piston cylinder, the ring having a plurality of slots which form upper reservoirs above the pocket and which are open inwardly and outwardly of the ring, and the ring having a restricted passage leading from the pocket to a surface of the ring which, in use, is adjacent the ring groove of a piston, whereby excess lubricant from the pocket may pass behind the ring to the upper reservoirs.

4. A piston ring having a lower reservoir formed by an outwardly open groove the lower wall of which slopes downwardly, the ring having lands coextensive with the groove above and below the same for contact with a piston cylinder, said ring having a plurality of slots which form upper reservoirs above the lower reservoir and which are open inwardly and outwardly of the ring, the ring having a restricted passage leading from the lower reservoir to the bottom surface of the ring, whereby excess lubricant from the lower reservoir may pass behind the ring to the upper reservoirs.

5. A piston ring, having a reservoir therein which opens outwardly of the ring and divides it into a lower land surface and an upper land surface, said ring having spaced relatively restricted passages and extending from the reservoir to the bottom surface of the ring, and having additional spaced passages operatively connecting the interior of the reservoir with the inner surface of the ring.

LOUIS W. HERBST.